(12) United States Patent
Bordeau et al.

(10) Patent No.: US 8,439,079 B2
(45) Date of Patent: May 14, 2013

(54) TWO PLATE MANIFOLD WITH CROSSOVERS

(75) Inventors: Bucky J. Bordeau, Watertown, NY (US); Eric Wright, Evans Mill, NY (US)

(73) Assignee: New York Air Brake Corporation, Watertown, NY (US)

( * ) Notice: Subject to any disclaimer, the term of this patent is extended or adjusted under 35 U.S.C. 154(b) by 1063 days.

(21) Appl. No.: 12/250,011

(22) Filed: Oct. 13, 2008

(65) Prior Publication Data
US 2010/0089465 A1 Apr. 15, 2010

(51) Int. Cl.
*F15B 13/00* (2006.01)

(52) U.S. Cl.
USPC .......................................................... 137/884

(58) Field of Classification Search ............. 137/884
See application file for complete search history.

(56) References Cited

U.S. PATENT DOCUMENTS

| | | | | |
|---|---|---|---|---|
| 3,548,849 A | * | 12/1970 | Jahnke et al. ................. | 137/815 |
| 3,572,368 A | * | 3/1971 | Bullmer ........................ | 137/269 |
| 3,707,163 A | * | 12/1972 | Hugler .......................... | 137/271 |
| 4,449,426 A | | 5/1984 | Younger | |
| 4,951,709 A | | 8/1990 | Kirkham | |
| 5,803,124 A | * | 9/1998 | Newton et al. ................. | 137/884 |
| 6,000,422 A | * | 12/1999 | Shigemoto .................... | 137/312 |
| 7,204,273 B1 | * | 4/2007 | Zub et al. ..................... | 137/884 |
| 2002/0153130 A1 | * | 10/2002 | Okamoto et al. ............. | 165/170 |

* cited by examiner

*Primary Examiner* — John Fox
*Assistant Examiner* — Hailey K Do

(57) ABSTRACT

A manifold includes first and second plates secured together at an inner face of each plate. A plurality of chambers and passages are in the inner faces of the plates and at least one port on an outer face of each plate connected to one of the chambers and passages. A crossover element in the crossing chamber or passage of the first plate separates a chamber or passage in the first plate from a chamber or passage in the second plate in the area where the chambers or passages cross.

2 Claims, 4 Drawing Sheets

TWO PLATE MANIFOLD WITH CROSSOVERS

BACKGROUND AND SUMMARY

The present invention relates generally to pneumatic manifolds and more specifically to pneumatic manifolds for rail vehicle brakes.

Manifolds for rail vehicle brakes include a plurality of faces having ports for connection to pneumatic devices, sources of pneumatic fluid and pneumatic circuits connected to the faces. In some cases, pneumatic devices are mounted on the face and in other cases, the pneumatic devices, sources of pneumatic fluid and pneumatic circuits are connected to the device by hoses or other couplings. The manifold is mounted to the rail vehicle. The rail vehicle may include locomotives or cars including freight, passenger and mass transit.

One example of a prior art manifold, used for example in a freight locomotive known as CCB from New York Air Brake Corporation, is illustrated in FIGS. 1-3 of U.S. Pat. No. 5,803,124. The manifold includes two plates having the interior faces machined to provide passages and chambers and the exterior faces machined to have bores for connecting the passages and chambers to ports on the exterior faces. The passages are generally shallower than the chambers. Adhesives are applied to the interior faces to bond the two plates together. The adhesives sometimes would extend into the shallow passages and block them. These manifolds had to be scrapped. Also, circuitous path had to be selected for the connection of the ports on either a common face or the opposite exterior faces. This limited the placement of the ports on the exterior faces of the manifold. This is particularly detrimental where the pneumatic devices are mounted on one of the faces instead of just mere connection to external or non-mounted pneumatic device.

For the prior art structure of FIGS. 1-3 of U.S. Pat. No. 5,803,124, the two core plates, for example, are ¾ of an inch thick. This allowed a chamber depth of ½ inch into each plate for a combined depth of one inch chambers. If a bypass was needed because of the layout, a ¼ inch thick cover plate would be provided as a bypass plate on one of the exterior faces.

The prior art manifold to FIGS. 1-3 was an improvement over a previous prior art manifold illustrated in FIG. 4 of U.S. Pat. No. 5,803,124. This included a center core plate with a pair of cover plates. The core plate was machined to include the chambers and passages and the cover plates provided connection to external ports. The cover plates were substantially thinner than the core plate. Typically, the core plate was one inch thick and the cover plate was ½ inch thick. The one-inch thick core plate limited the depths of the chambers to ¾ of an inch.

FIGS. 5-7 of U.S. Pat. No. 5,803,124 illustrated a three plate manifold wherein the center plate formed the crossover separation between chambers and passages in the two outer plates. The center plate had a thickness in the range of ¹⁄₁₆ to ¼ of an inch and the cover plates were ¾ of an inch thick. This manifold structure removes the limitation of the positioning of the chambers and passages.

The present manifold is a modification of the three plate manifold to two plates with all the same advantages. The present manifold includes first and second plates secured together at an inner face of each plate. A plurality of chambers and passages are in the inner faces of the plates and at least one port on an outer face of each plate connected to one of the chambers and passages. A crossover element in the crossing chamber or passage of the first plate separates a chamber or passage in the first plate from a chamber or passage in the second plate in the area where the chambers or passages cross.

The crossover element has a face flush with the inner face of the first plate. The crossing chamber or passage in the first plate has a first width in the inner face of the first plate and the crossover element has a second width greater than the first width. The crossover element may be in a recess in the inner face of the first plate and the recess has a width greater than a width of the crossing chamber or passage in the first plate and a depth less that a depth of the crossing chamber or passage in the first plate. The crossover element may be a third plate, a disk and/or a block with a bore extending along the length of the crossing chamber or passage.

A first chamber or passage in the second plate lies between a second and third chamber or passage in the second plate. The crossing chamber or passage in the first plate extends over the first chamber or passage and is connected to the second and third chambers or passages.

A method of making a manifold for a rail vehicle includes forming first and second plated each with a plurality of chambers and passages in an inner face of the plates and at least one port on an outer face of each plate connected to one of the chambers and passages. A crossover element is positioned in a crossing chamber or passage in the first plate. The inner surfaces of the first and second plates are positioned adjacent each other with the crossover element over a chamber or passage of the second plate; and secured.

The crossover element is positioned in the crossing chamber or passage with a face extending above the inner face of the first plate. The height of the face of the crossover element is reduced to be flush with the inner face of the first plate before the securing.

Other objects, advantages and novel features of the present invention will become apparent from the following detailed description when considered in conjunction with the accompanying drawings.

DETAILED DESCRIPTION OF THE PREFERRED EMBODIMENTS

Figure 1:
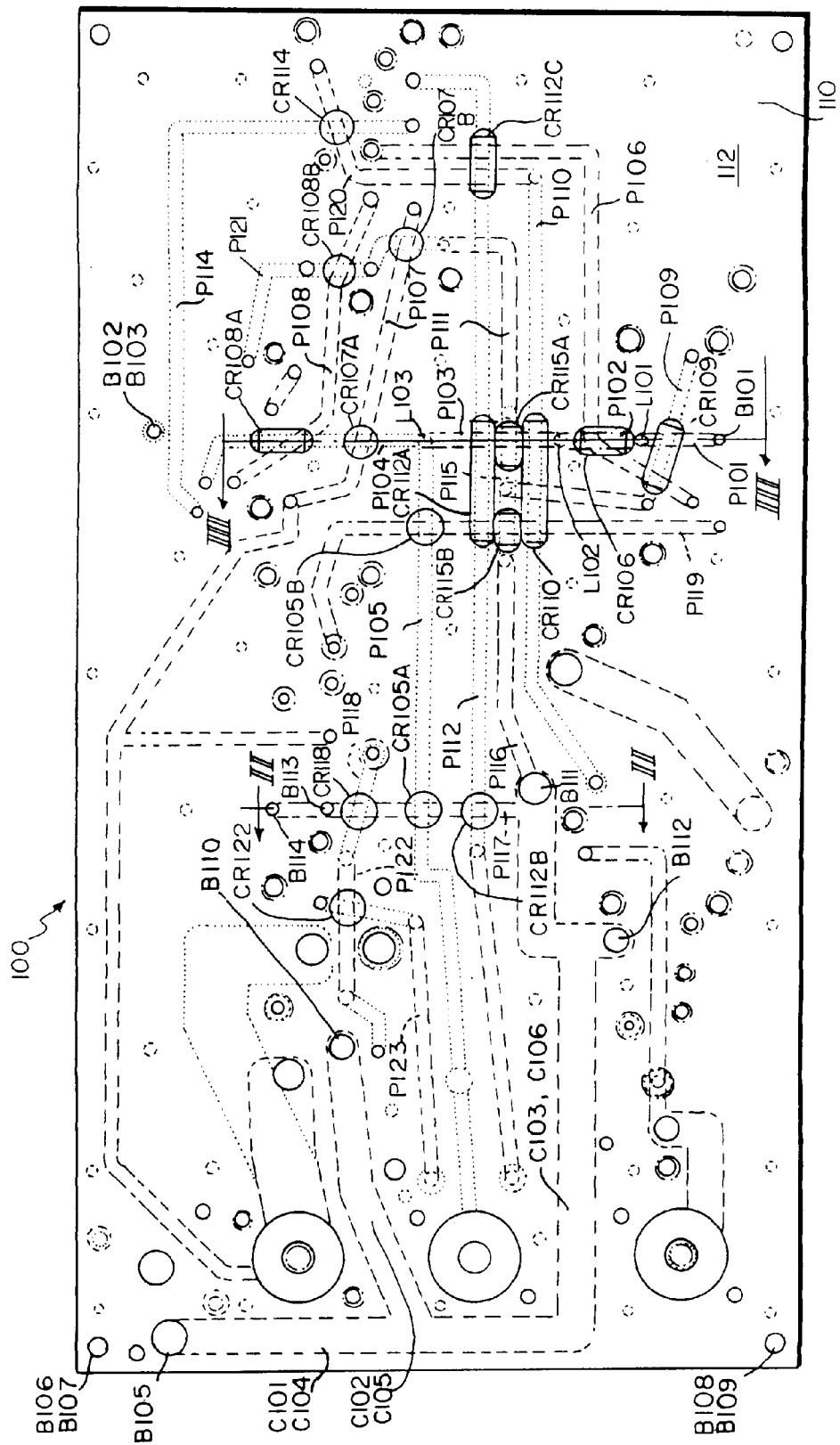
FIG. 1 is a transparent overlay of the passages, chambers and ports of a double core manifold of according to the principles of the present disclosure.

An improved manifold for railroad vehicle brakes is illustrated in FIGS. 1-5. In comparing some manifolds the prior art and FIG. 1, it is evident that the passages P do not extend in circuitous paths but continuously cross over each other without limitation. This allows greater flexibility and design of location of ports and elements on the manifold since the interconnection of the ports by the passages is not limited.

Referring to FIGS. 1-5, the manifold 100 includes a front plate 110, having an exterior face 112 and an interior face 114 and a rear plate 120 having an exterior face 122 and an interior face 124. The interior faces 114 of plate 110 and 124 of plate 120 are bonded together. The front and rear plates 110 and 120 include bores B, passages P and chambers C, the center plate 130.

Bore B 101 connects a port on exterior surface of plate 110 to passage P101. Passage P102 in rear plate 120 is connected to passage P101 by an overlap L101 and passage P103 in plate 110 by overlap L102. Passages P104 and P105 in rear plate 120 are connected to passage P103 by overlap L103.

Passages P106, P107 and P108 in the front plate 110 cross over passages P102 and P104 in the rear plate 120 and are separated there from by crossover elements CR106, CR107A and CR108A respectively. Passages P109, P110, P112 and P115 in the rear plate 120 cross over passages P101 and P103 in front plate 110 and are pneumatically isolated there from by crossover elements CR109, CR110, CR112A and CR115A respectively. Passages P105, P112 and P118 in the rear plate 120 cross over passage P117 in front plate 110 and are pneumatically isolated there from by crossover elements CR105A, CR112B and CR118 respectively. Passages P105, P110, P112 and P115 in the rear plate P120 cross over passage P119 in front plate 110 and are pneumatically isolated there from by crossover elements CR105B, CR110, CR112A and CR115B respectively.

Passages P106, P111 and P120 in the front plate 110 cross over passage P112 in rear plate 120 and are pneumatically isolated there from by common crossover element CR112C. Passage P120 in the front plate 110 also crosses over passage P114 in rear plate 120 and is pneumatically isolated there from by crossover element CR114. Passages P107 and P108 in the front plate 110 cross over passage P121 in rear plate 120 and are pneumatically isolated there from by crossover elements CR107B and CR108B respectively. Passage P122 in the front plate 110 crosses over passage P123 in rear plate 120 and is pneumatically isolated there from by crossover element CR122.

Bore B101 in the front plate 110 is connected to passage P101. Bore B102 in plate 110 is coaxial with and connected to threaded bore B103 in plate 120. Chambers C101, C102 and C103 in the front plate 110 are coextensive and juxtapose chambers C104, C105 and C106 in the rear plate 120. A bore 105 in front plate 110 connects the chamber C101 to a port on exterior face 112 and connects chambers C101 and C104. A bore B110 connects a port on face 112 to chambers 102 and connects chambers C102 and C105. Similarly, bores B111 and B112 connect to ports on exterior surface 112 and chambers C103 and C106 together. Bores B113 and B114 connect ports on exterior surface 112 to passage P117.

Passage P119 is an example of a passage in the plate 110 lying between two passages P111 and P116 in the plate 110. The crossing passage P115 in the plate 120 crosses over passage P119 and is connected to and connects passages P111 and P116.

Through bores, including B106, B107 and B108, B109 for example, are provided in the four corners in the two plates to receive fasteners for mounting the manifold 100 to an appropriate bracket.

Figure 2:
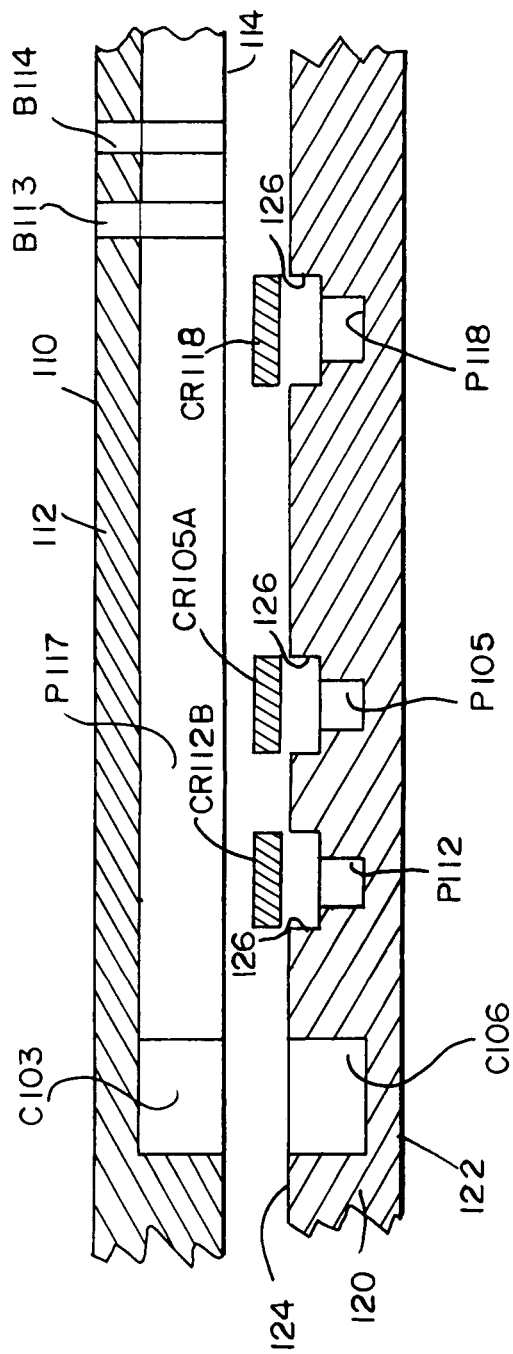
FIG. 2 is an exploded cross-sectional view taken along lines II-II of FIG. 1.
Figure 3:
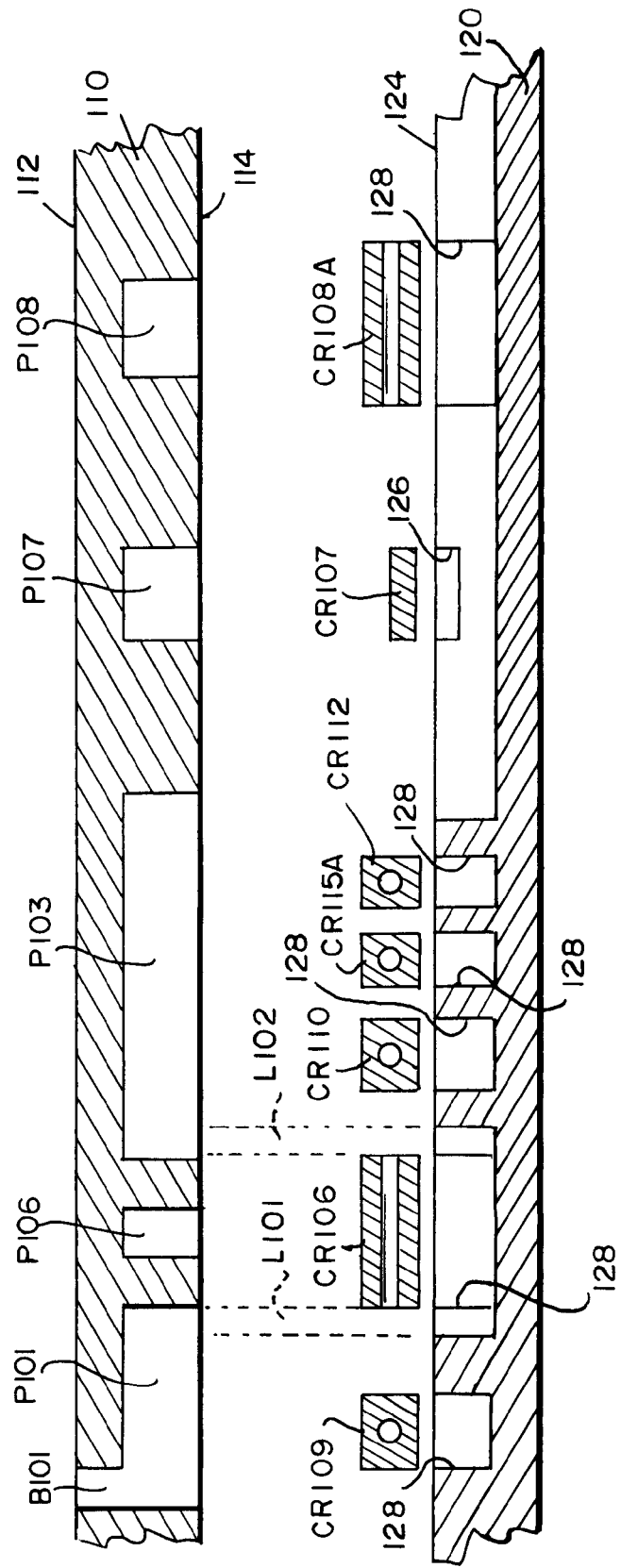
FIG. 3 is an exploded cross-sectional view taken along lines III-III of FIG. 1.

Comparing the passages P to the chamber C in FIGS. 2 and 3, it will be noted that they are the same depth. Since the chambers are generally wider than the passages, they are not detrimentally affected by glue or the bonding agent extending into the chambers. By making the passages P the same depth as the chamber C, any bonding agent which accidentally gets in the passages P, would not restrict the passage. As a typical example, the front 110 is approximately 1.0 inches and the rear plates 120 is approximately 0.85 inches thick and the depth of the passages P and the chamber C are approximately 0.610 inches.

Figure 4:
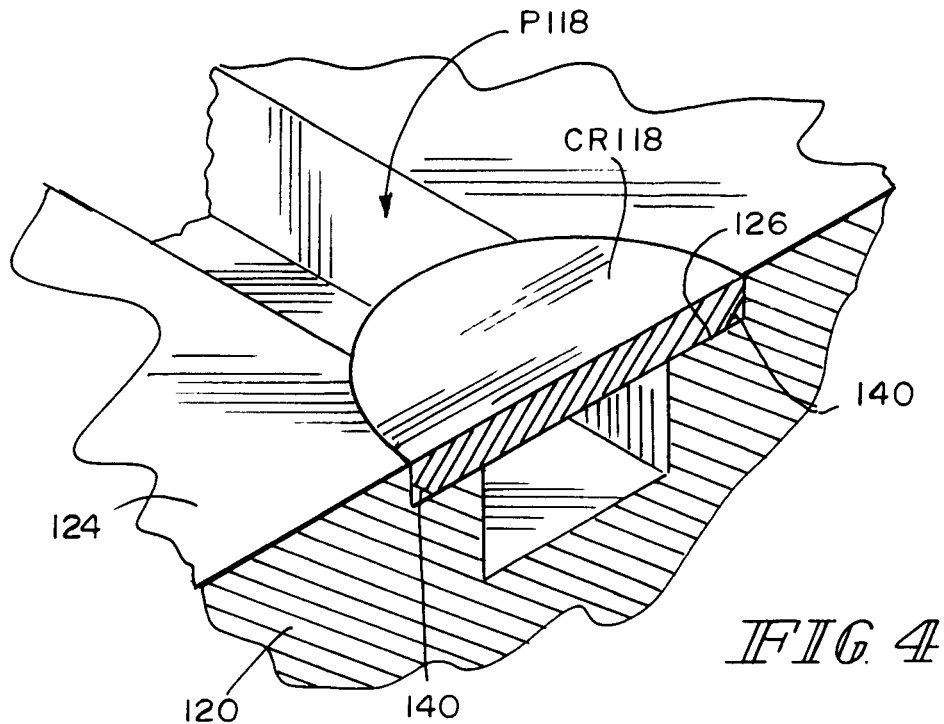
FIG. 4 is a perspective cross-sectional view of a plate/disk crossover element according to the principles of the present disclosure.

There are two basic types of crossover elements in the present manifold design. There are disks or plates which sit in a shallow recess 126 in the interior face 122 of the rear plate 120 and a block with a bore which sits in a deeper recess 128 in the passage chamber. As shown in FIGS. 1 and 4, the disks, CR118 are a circular disk which extends wider than the thickness of each of the intersecting passages to pneumatically isolate them from each other. By extending laterally, it provides support for the disk and provides for appropriate sealing of the elements. For the plate 120 having a thickness of 0.85 inches and a channel depth of 0.610 inches for example, the depth of recess 126 maybe 0.23 inches. The original disk would have a thickness of 0.25 inches. After it is inserted and secured, the disks are machined until the top surface of the disk is planed down with the top surface 124 of the back plate 120.

Figure 5:
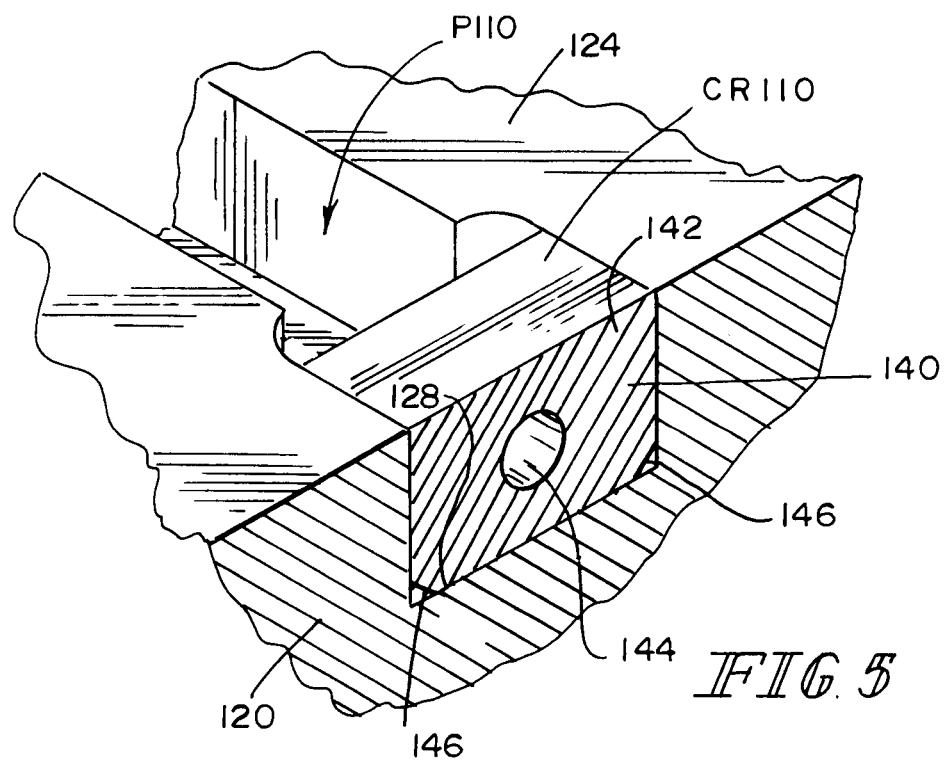
FIG. 5 is a perspective cross-sectional view of a block with a bore crossover element according to the principles of the present disclosure.

The block with the bore in a passage is illustrated in FIG. 5. Block 140 has a bore 142 extending along its length which is the length of the crossing chamber or passage. Using the previous examples, the depth of the recess 128 would be 0.610 inches and the depth of the block 140 is 0.625. As with the disk of FIG. 4, the block is inserted and secured and then planed down such that its top surface is planar with the interior surface 124 and the plate 120. Although the bottom of the recess for the blocks 140 is the bottom of the channel or passage, it may be raised from the bottom of the channel or passage.

The disks have a chamfered circumference 140 at it is bottom edge to guide the disk into the recess 126. The block 140 includes bottom chamfered corners 146 at the bottom edge. The sides are machined for proper fit in the channel or passage. The diameter of the bore 142 may be for example 0.375. A diameter of 0.375 at its outer bottom circumference 140.

The chamfering surfaces 140 and 146 act as an alignment or lead for the crossover element in the recess during the press operation.

Although the disk in FIG. 3 is shown as a circular disk, it may be of oblong shape and may form a crossover element for two adjacent crossing passages.

The bores B, the passages P, the chambers C and the recesses for the crossover elements are machined in the front and rear plates 110 and 120.

The method of assembly would include press fitting the crossover elements into their corresponding recess and machining the top surface to be planar with the inner surface 124 of the bottom plate 120. Next adhesive would be applied to the interior faces 114 and 124 of the front and rear plates 110 and 120 and they would be positioned and aligned on each other. The combined structure would then be clamped and the adhesive cured. If cured at room temperature, the curing would take 24 hours. Alternatively, the manifold 100 can be placed in 300° F. oven for four hours Preferably, a silk screening process is used to apply the adhesive. The order of applying the plates to each other is not critical.

Although the present invention has been described and illustrated in detail, it is to be clearly understood that the same is by way of illustration and example only, and is not to be taken by way of limitation. Although a locomotive brake manifold has been used by way of example, the present invention is applicable to any manifold requiring a substantial number of connections and interconnections of ports on different faces of the manifold. The scope of the present invention is to be limited only by the terms of the appended claims.

What is claimed:

1. A manifold for a rail vehicle comprising:
   first and second plates secured together at an inner face of each plate;
   a plurality of chambers and passages in the inner faces of the plates and at least one port on an outer face of each plate connected to one of the chambers and passages; and
   a crossover element separating a chamber or passage in the first plate from a chamber or passage in the second plate in the area where the chambers or passages cross;
   wherein the crossover element is in a crossing chamber or passage of the first plate;
   wherein a first chamber or passage in the second plate lies between a second and third chamber or passage in the second plate and the crossing chamber or passage in the first plate extends over the first chamber or passage and is connected to the second and third chambers or passages.

2. A method of making a manifold for a rail vehicle comprising:
   forming first and second plates each with a plurality of chambers and passages in an inner face of the plates and at least one port on an outer face of each plate connected to one of the chambers and passages;
   positioning a crossover element in a crossing chamber or passage in the first plate;
   positioning the inner surfaces of the first and second plates adjacent each other with the crossover element over a chamber or passage of the second plate; and
   securing the first and second plates to each other at the inner surfaces;
   wherein a first chamber or passage formed in the second plate lies between a second and third chamber or passage formed in the second plate and the crossing chamber or passage in the first plate is formed to extend over the first chamber or passage and is connected to the second and third chambers or passages when the first and second plates are secured to each other.

* * * * *